(12) United States Patent
Bauer et al.

(10) Patent No.: US 11,674,087 B2
(45) Date of Patent: Jun. 13, 2023

(54) MICROWAVE METHODS FOR CONVERTING HYDROCARBON-BASED WASTE MATERIALS INTO OIL AND GAS FUELS

(71) Applicant: Resynergi, Inc., Rohnert Park, CA (US)

(72) Inventors: Brian Bauer, Sebastopol, CA (US); Jason Tanne, Vancouver, WA (US); Tyler Spott, Rohnert Park, CA (US); Frank Mayhew, Graton, CA (US); A. J. McInnis, San Jose, CA (US); Mathew Leis, Redwood City, CA (US); Christopher Cardinal, Sunnyvale, CA (US); Tom Greer, Graton, CA (US)

( * ) Notice: Subject to any disclaimer, the term of this patent is extended or adjusted under 35 U.S.C. 154(b) by 157 days.

(21) Appl. No.: 17/250,284

(22) PCT Filed: Jun. 28, 2019

(86) PCT No.: PCT/US2019/039985
§ 371 (c)(1),
(2) Date: Dec. 28, 2020

(87) PCT Pub. No.: WO2020/006512
PCT Pub. Date: Jan. 2, 2020

(65) Prior Publication Data
US 2021/0122980 A1      Apr. 29, 2021

Related U.S. Application Data

(60) Provisional application No. 62/691,514, filed on Jun. 28, 2018.

(51) Int. Cl.
*C10B 53/07*      (2006.01)
*B01J 19/12*      (2006.01)
*C10L 3/12*       (2006.01)
*B01J 4/00*       (2006.01)
*C10B 31/02*      (2006.01)
(Continued)

(52) U.S. Cl.
CPC ............. *C10B 53/07* (2013.01); *B01J 4/001* (2013.01); *B01J 19/126* (2013.01); *C10B 31/02* (2013.01); *C10L 3/08* (2013.01); *C10L 3/12* (2013.01); *H05B 6/647* (2013.01); *C10L 2200/0423* (2013.01); *C10L 2200/0446* (2013.01); *C10L 2200/0469* (2013.01); *H05B 2206/045* (2013.01)

(58) Field of Classification Search
CPC .......... C10B 53/07; B01J 19/126; C10L 3/12
See application file for complete search history.

(56) References Cited

U.S. PATENT DOCUMENTS 6,086,679 A * 7/2000 Lee .................. B05D 1/60
118/723 MR

* cited by examiner

*Primary Examiner* — Ellen M McAvoy
*Assistant Examiner* — Ming Cheung Po

(57) ABSTRACT

A portable, sustainable, and efficient system and apparatus for breaking down processed solid plastic waste and other polymer-based feedstock into fuel oil, sustainable energy, carbon char, and other useful products. With minor modifications, biomass can also be treated. Distributed microwave heating sources and mechanical mixing effectively mix heat in a highly insulated reactor that protects the microwave components, makes fast pyrolysis possible, and thereby enables scaling down to compact and highly portable systems. Products include diesel, gasoline, propane, butane, and char. Product materials are distributed using tight temperature control and mechanical routing.

18 Claims, 8 Drawing Sheets

(51) Int. Cl.
*C10L 3/08* (2006.01)
*H05B 6/64* (2006.01)

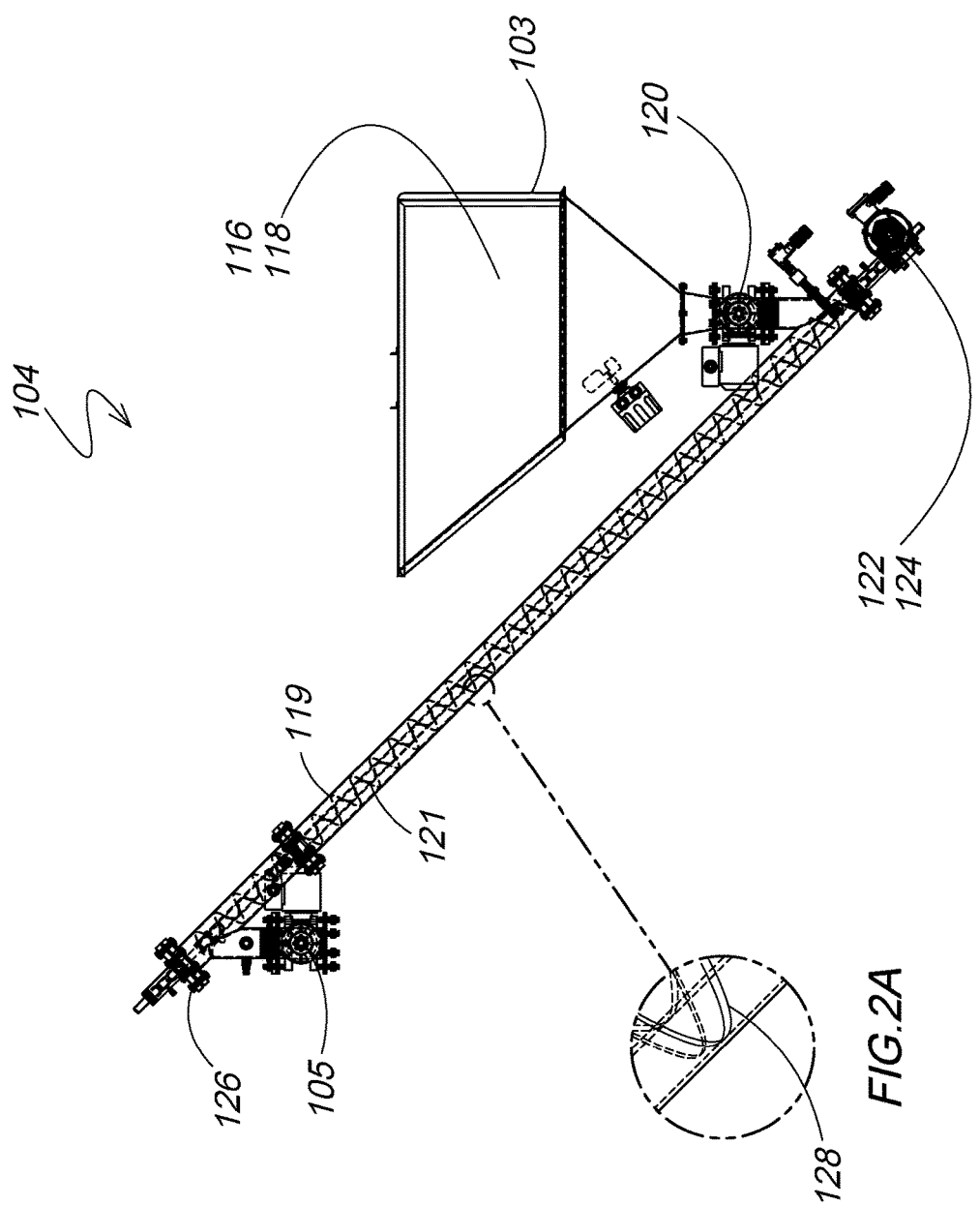

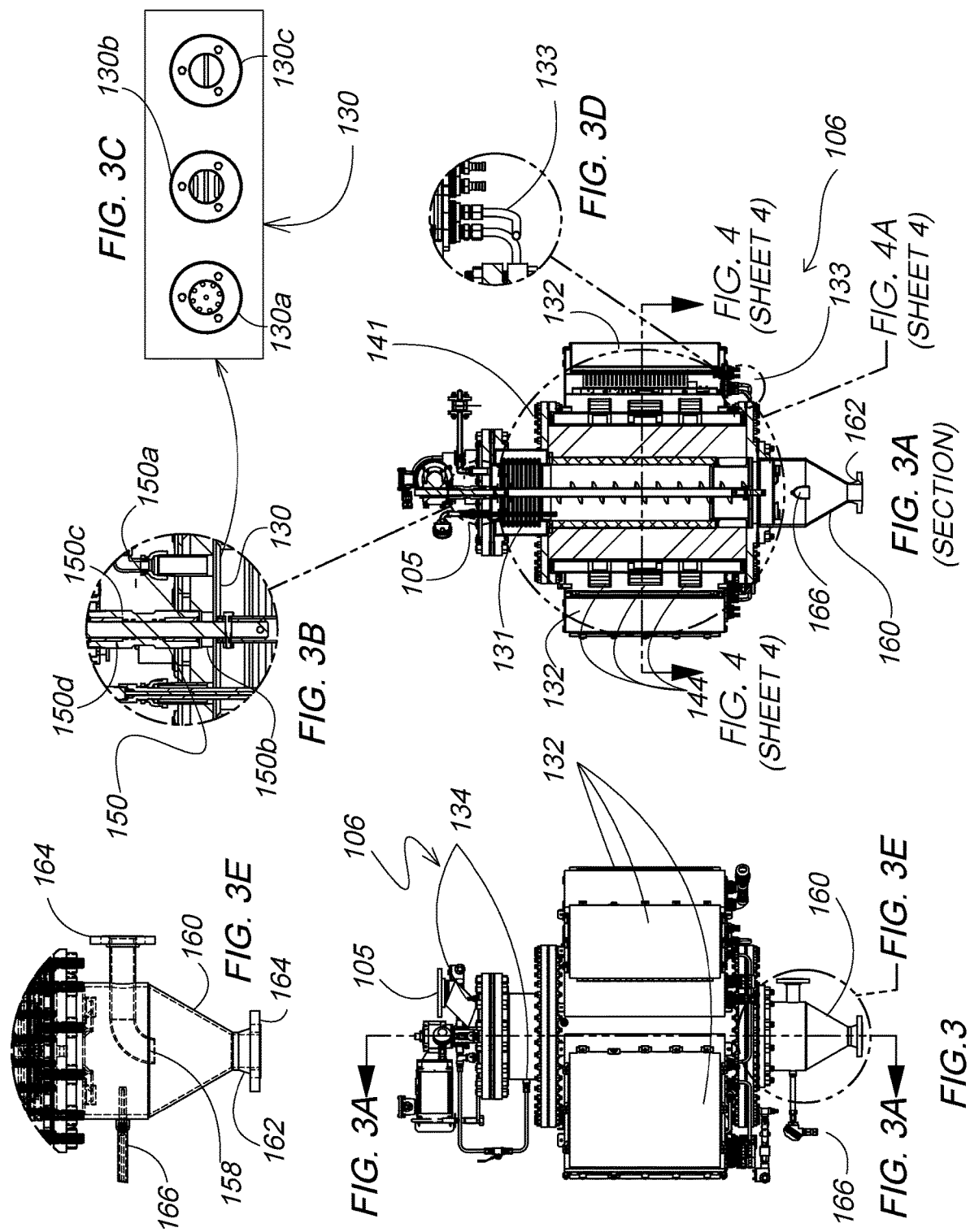

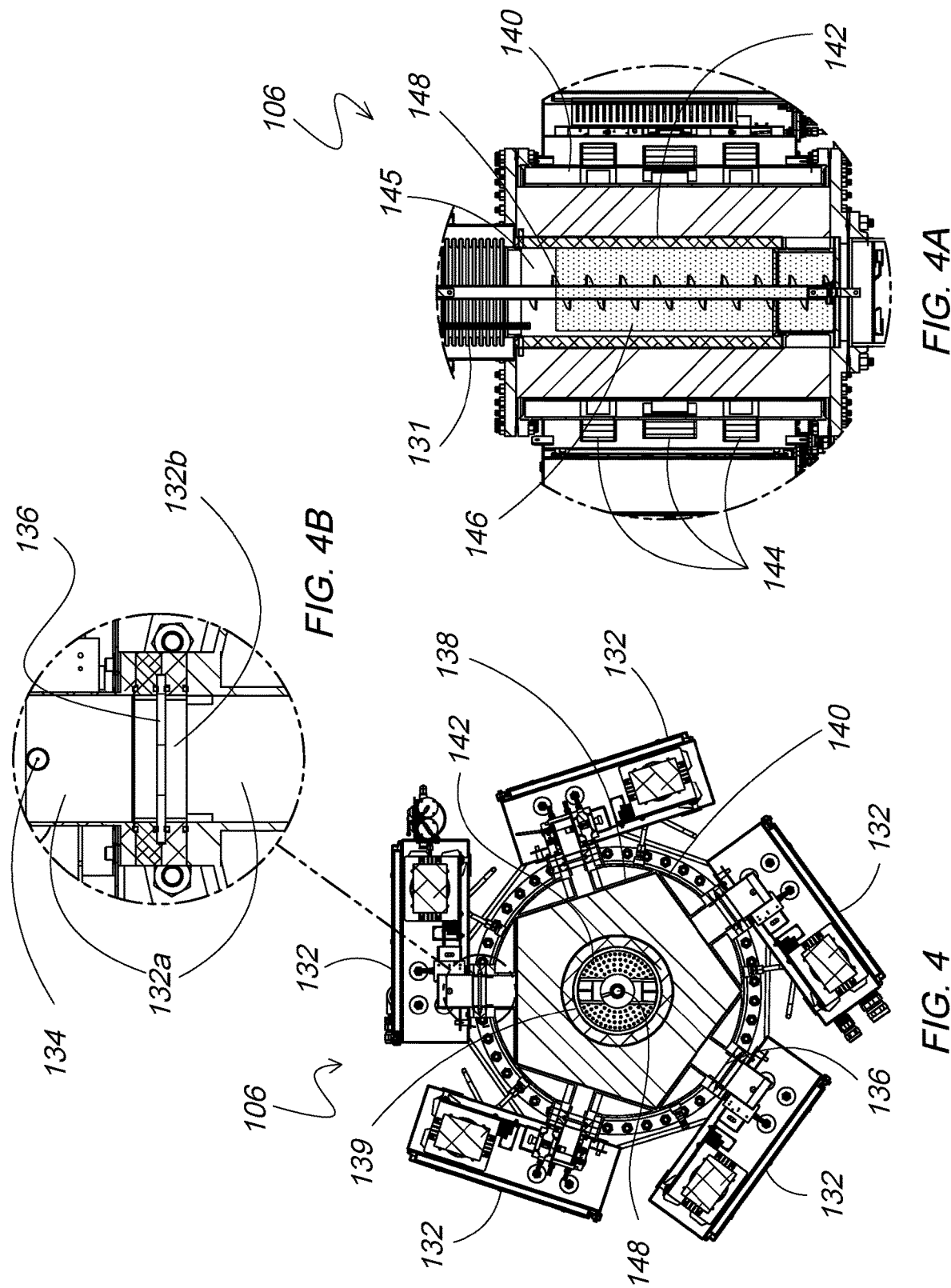

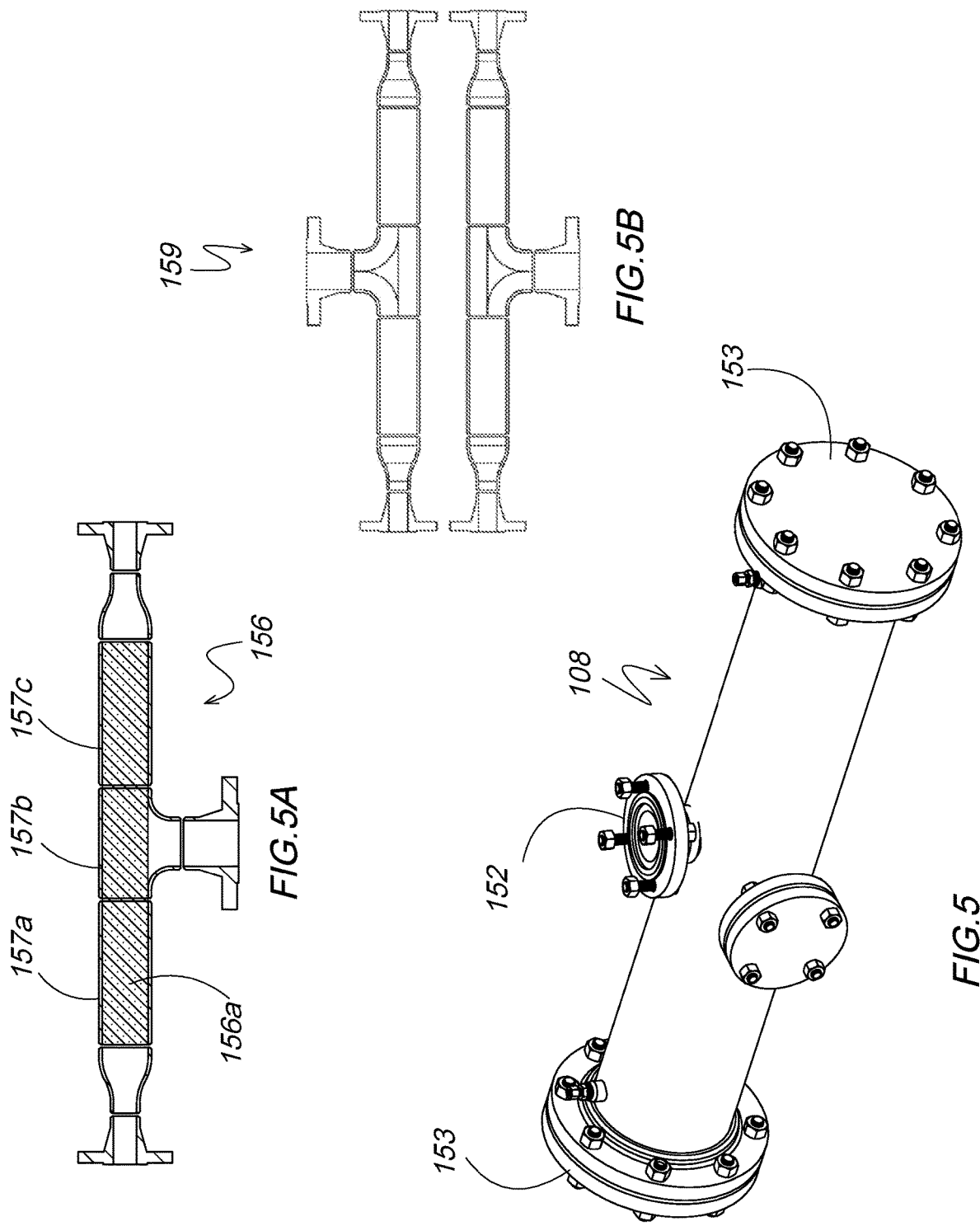

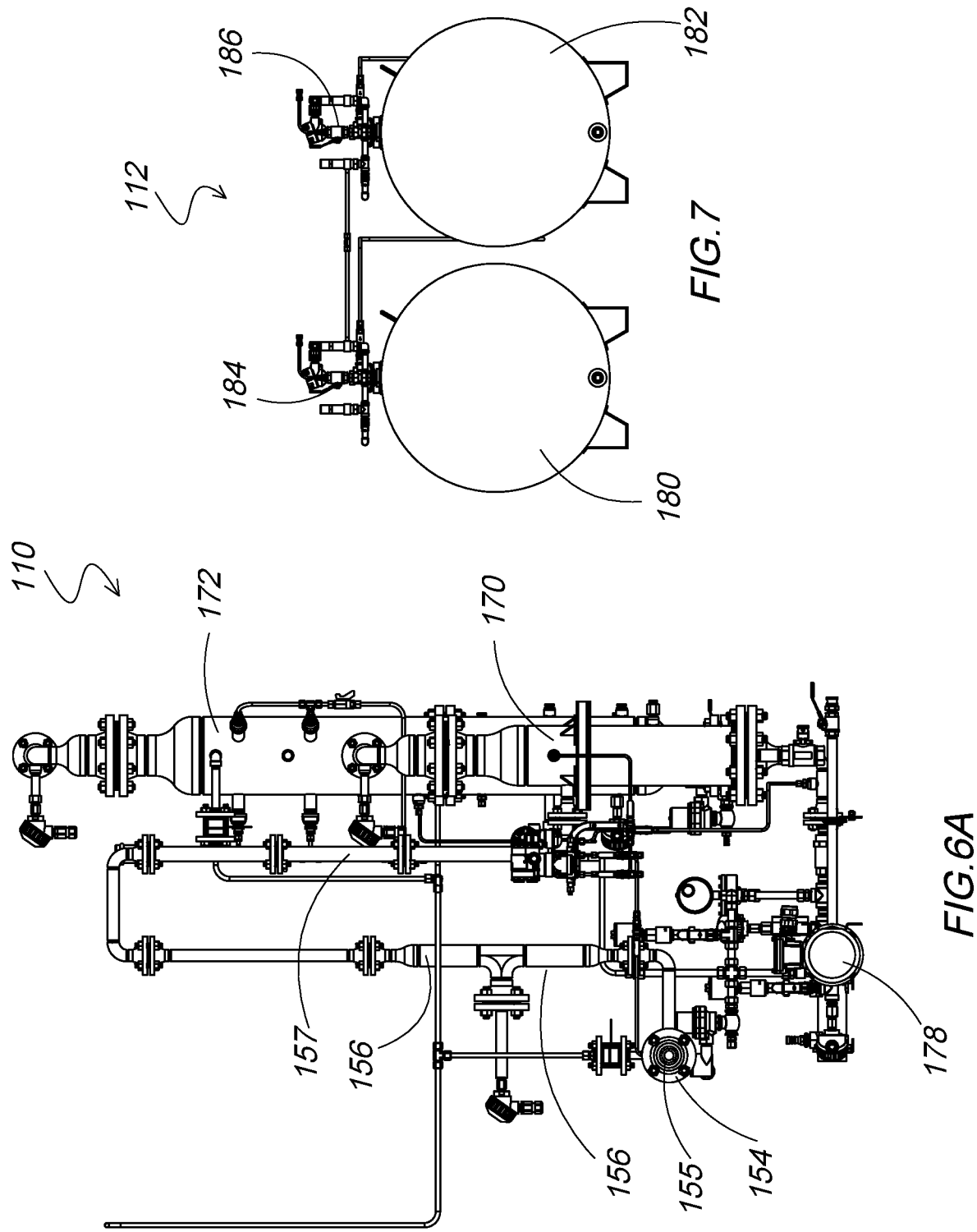

MICROWAVE METHODS FOR CONVERTING HYDROCARBON-BASED WASTE MATERIALS INTO OIL AND GAS FUELS

BACKGROUND OF THE INVENTION

Technical Field

The present invention relates most generally to systems for converting a material-specific solid waste stream into commercially valuable chemical commodities, and more particularly to a plastic waste pyrolysis system, and still more particularly to an energetically efficient plastic pyrolysis system using microwave energy to heat comminuted waste plastic into useful and separable byproducts, including fuel.

Background Art

It is known to use thermal decomposition technology, and more particularly pyrolysis technology, for converting plastic waste into combustible fuels. Energy efficiency and demonstrable sustainability have been elusive, however. Likewise, designing systems that minimize the generation of unsafe byproduct compounds is a system imperative, as some material transformations can produce heavy metals, as well as sulphurous and nitrogenous compounds. Nevertheless, with improved efficiency and increased portability, plastic pyrolysis systems hold promise for resolving the overwhelming accumulation of waste plastic in the oceans, on beaches, and in urban areas. It is to that end that the present invention is directed.

Potentially pertinent prior art patents and/or patent applications include: U.S. Pat. Appl. Ser. No. 20090062581, by Appel; U.S. Pat. Appl. Ser. No. 20100155216 by Benham; U.S. Pat. No. 9,487,708, to Doucet et al; U.S. Pat. No. 8,382,957, to Farneman et al.; U.S. Pat. No. 9,664,382, to Flanagan, et al; U.S. Pat. No. 8,690,977, to Gillespie; U.S. Pat. No. 6,830,597, to Green; U.S. Pat. No. 7,883,606, to Grispin; U.S. Pat. No. 6,184,427, to Klepfer; U.S. Pat. Appl. Ser. No. 20040253166, by Kruesi; U.S. Pat. Appl. Ser. No. 20100256429, by Li et al; U.S. Pat. No. 8,657,999, to Lissianski et al; U.S. Pat. No. 8,980,064 to Manderson et al; U.S. Pat. Appl. Ser. No. 20080264934 by Moreira et al; U.S. Pat. No. 7,927,465, to Novak; U.S. Pat. No. 7,951,270, to Ludlow-Palafox et al; U.S. Pat. No. 7,629,497, to Pringle; U.S. Pat. No. 9,802,184, to Ramesh; U.S. Pat. No. 7,531,703 to Ramesh et al; U.S. Pat. No. 8,927,797, to Sarker; U.S. Pat. No. 8,187,428, to Shimo et al; U.S. Pat. No. 8,361,282, to Van Thorre et al; U.S. Pat. No. 4,118,282, to Wallace; and U.S. Pat. No. 7,101,463, to Weinecke et al.

The foregoing patents reflect the current state of the art of which the present inventors are aware. They further provide background art useful for understanding the many purposes for which the present invention is intended, as well as the state of the art of the pertinent technology. However, it is respectfully submitted that none of the above-indicated patents disclose, teach, suggest, show, or otherwise render obvious, either singly or when considered in combination, the invention described herein.

DISCLOSURE OF INVENTION

The present invention is a modular, portable, sustainable, and efficient means of breaking down processed solid plastic waste and other carbon-containing and polymer-based feedstock into fuel oil, sustainable energy, carbon char and other useful products. It is not limited, however, to polymers, and with some modifications, biomass can also be treated. System output includes, but is not limited to, diesel, gasoline, propane, butane, and char. The subject invention uses distributed microwave heating sources to effectively mix heat in a highly insulated reactor that protects the microwave components for commercial reliability. Means for distributing product materials using tight temperature control and mechanical routing are presented. Importantly, the present invention exploits the numerous advantages of using microwave heating, including uniform and rapid internal heating of large volumes of waste biomass or polymeric particles, rapid start-up and shut down, high energy efficiency, and increased controllability.

The many novel features characteristic of the invention, as to organization and method of operation, together with various objects and advantages thereof, will be better understood from the following description considered in connection with the accompanying drawings, in which preferred embodiments of the invention are illustrated by way of example. The drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be understood and its objects other than those set forth above will become apparent when consideration is given to the following detailed description. This description makes reference to the annexed drawings, wherein:

FIG. 2 is a side view in elevation showing the waste product input (i.e., feed assembly) in accordance with the present invention, adapted to accept material via a mechanical hopper for holding raw material. In the alternative, mechanical transport of material can be incorporated using vacuum or pressure-feed methods (standard extruder functionality with unique extension and reactor feed);

FIG. 2A is a detailed cross-sectional side section view taken along section line 2A-2A of FIG. 2, showing the auger flight shape and conveyor pipe wall of the feed assembly;

FIG. 3 is a side view in elevation showing the reactor assembly gasifier in accordance with the invention, the view featuring integrated mounting of microwave magnetrons, band heaters, and provisions for cleanout of waste product;

FIG. 3A is a cross-sectional side view in elevation taken along section line 3A-3A of FIG. 3, illustrating the reactor gasifier;

FIG. 3B is a detailed cross-sectional side view in elevation taken along section 3B-3B of FIG. 3A, and shows the material feedstock inlet(s) location(s), and bearing details for the gasifier mixer, adopted to improve the service life and longevity of equipment operating at exceedingly high temperatures.

FIG. 3C is a schematic view illustrating possible material feedstock inlet(s) profiles in accordance with the subject invention when an injector feed screw system is employed to inject feedstock into the reactor chamber. The inlet openings are configured to improve the flow and surface area of material when an injector-style material feed is used.

FIG. 3D is a detailed side view in elevation taken along section line 3D of FIG. 3A, showing a purge gas manifolds used to create an inert gas atmosphere in accordance with the subject invention;

FIG. 3E is a detailed side view in elevation taken along section line 3E of FIG. 3, showing the updraft escapement and temperature monitoring elements employed in the subject invention, adopted to improve the production of oil and/or liquids, and reduce carbon char waste and by-products;

FIG. 4 is a cross-sectional top view taken along section line 4-4 of FIG. 3A, and illustrates the reactor gasifier of the present invention, featuring its polygonal wall sections and stacked microwave waveguides;

FIG. 4A is a detailed cross-sectional side view in elevation taken along section line 4A-4A of FIG. 3A, showing the primary structural and operational components of the reactor gasifier in accordance with the subject invention, especially featuring opposing microwave waveguides, thermal insulation, thermal mass absorbent (silicon carbide spheres), and mixing shaft;

FIG. 4B is a detailed top view taken along section line 4B of FIG. 4, showing a microwave window with an integrated knife gate adapted to optimize the power of the microwave energy by maintaining a clear microwave signal path by keeping debris away from the microwave window;

FIG. 5 illustrates the cleanout vessel in accordance with the subject invention, configured to collect and distribute the reaction output carbon char for either batch or continuous operation;

FIG. 5A is a detailed cross-sectional side view in elevation showing the catalyst cracking chamber in accordance with the subject invention;

FIG. 5B is a side view in elevation showing the catalyst cracking chamber incorporating multiple chambers that can be rotated for cleaning while continuing the process flow;

FIG. 6A is a left end view thereof; and

FIG. 7 is an elevational view showing the fuel collection and process monitoring in accordance with the subject invention.

BEST MODE FOR CARRYING OUT THE INVENTION

Figure 1A:
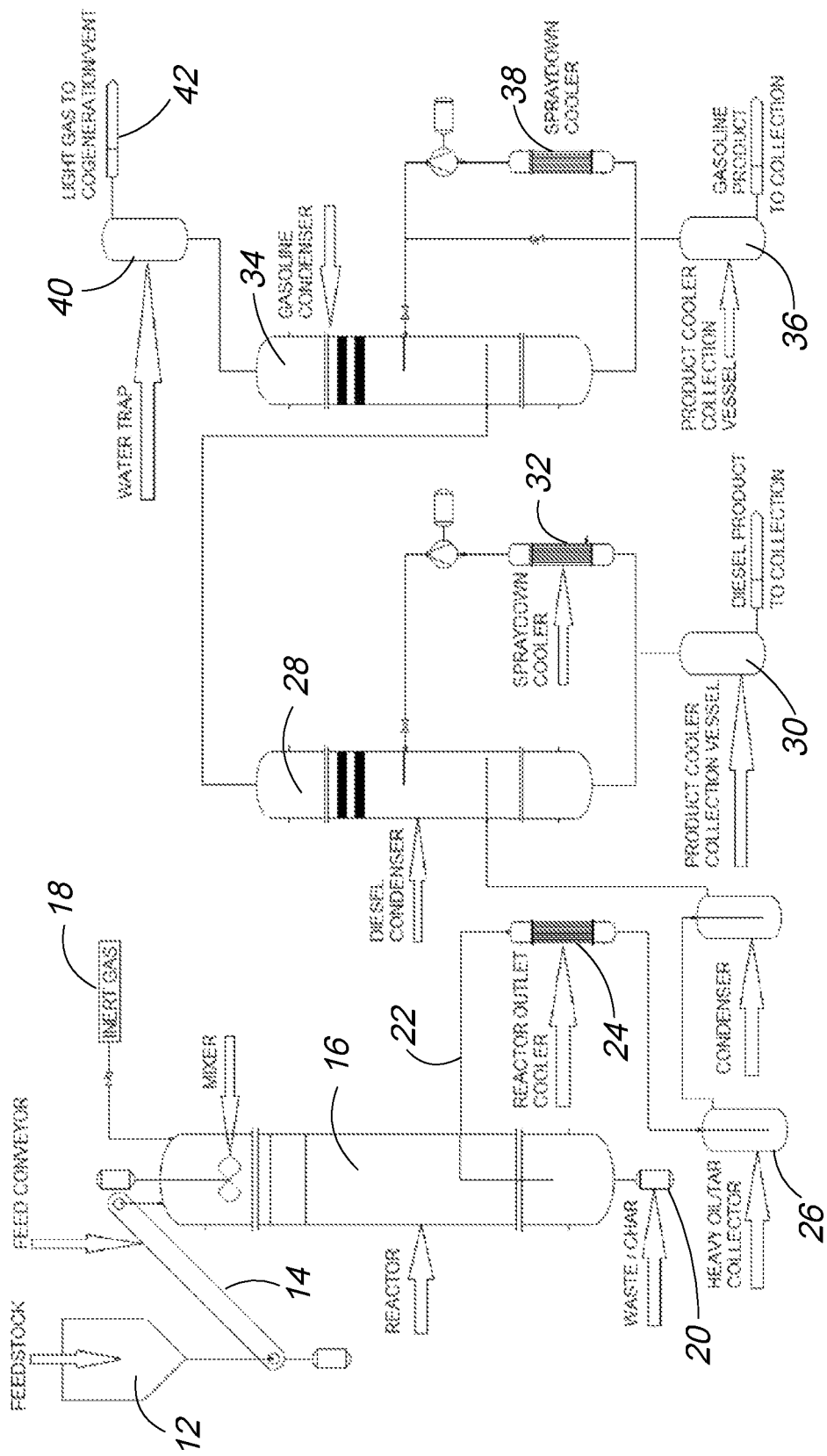
FIG. 1A is a highly schematic process diagram showing the structural and operational components of the pyrolysis system of the present invention.

Referring first to FIG. 1A, there is illustrated therein a new and improved method and system for converting hydrocarbon based waste materials into oil and gas fuels, the system generally denominated in this schematic view as 10 herein.

FIG. 1A is a highly schematic level process flow diagram showing the major functional components of the system, highlighting major sub-assembly systems. When ready for processing, in an embodiment the feedstock is fed from a feedstock hopper 12 into a mechanical conveyor 14 at ambient temperatures while maintaining optimal feed speeds. In another embodiment, the feedstock may be fed into the conveyor at elevated molten temperatures, also maintaining optimal feed rates. When fed at elevated temperatures, an extruder is employed to ensure smooth material flow into the reactor. Further, in embodiments, heated feedstock is cooled to a temperature between 30 C-50 C prior to introduction into the reactor to reduce the potential for premature melting and to allow for smooth feedstock entry into the reactor. Baffling may be employed in the cooling zone to ensure good mixing and heat transfer.

Upon entering the microwave-transparent reactor 16, the carbon-containing feedstock is heated to temperatures between 650-700 degrees C. through convective and conductive heat derived from multiple microwave sources (not shown in this view) mounted in a circular or polygonal orientation. The internal atmosphere purged of oxygen by introducing an inert gas from an inert gas source 18 to create an interior atmosphere of nitrogen or argon and is kept at low pressures of between 1-2 psig.

As is well known, in a pyrolysis system, the carbon-containing feedstock undergoes chemical decomposition under heat, which breaks or "cracks" large polymer chains into small polymer chains or even the monomers that were the precursor molecules in the treated waste polymers. Waste char exits the bottom of the reactor and is directed to a waste char collector 20. Once pyrolyzed, the pyrolyzed hydrocarbons vaporize, and the resulting gases exit the reactor and are directed into a catalyst-filled cracking chamber 22, followed by the reactor outlet cooler 24, which cools to appropriate temperature for the heavy oil/tar collector "wax trap" 26, and then through a condensation and cooling (distillation) system where they are further refined into controlled carbon chains and condensed into useable fuel oils of varying grades from diesel to gasoline. The distillation system first removes heavy oil and tar at a collector 26, and gases passing through the system are directed to a diesel condenser 28, which cools and then collects the heavier, longer chain diesel product in a product cooler collection vessel 30. Any gases passing with the precipitated diesel product are fed back to the diesel condenser after passing through a spraydown cooler 32. Lighter gases that do not precipitate in the diesel condenser are passed to a naphtha/gasoline condenser 34 and are similarly cooled and condensed, wherein naphtha/gasoline is collected in a product cooler collection vessel 36, and any accompanying gases are fed back to the condenser through a spraydown cooler 38. Water vapor and the lightest gases are removed from the top of the gasoline condenser and pass through a water trap 40, employed to improve fuel production by preventing fluid backflow and assuring positive flow. The lightest gases are vented off through a cogeneration/flare/catalytic oxydizer outlet 42.

As will be understood by those with skill in the art, as feedstock is treated and moves through the processing stages—from input as untreated feedstock at the feedstock conveyor, through pyrolysis cracking in the reactor, to and through catalytic chamber cracking, to condensation, separation, collection, and storage—the system components are in successive fluid communication, and such mechanical and operative coupling of one stage to its predecessor stage and to successor stages, if any, is assumed and understood throughout.

Assembly overview to highlight major sub-assembly systems: Referring now to FIG. 1B through FIG. 7, wherein like reference numerals refer to like components in the various views, the system in these non-schematic views is generally denominated 100 herein, while system components take discrete reference numbers.

Figure 1B:
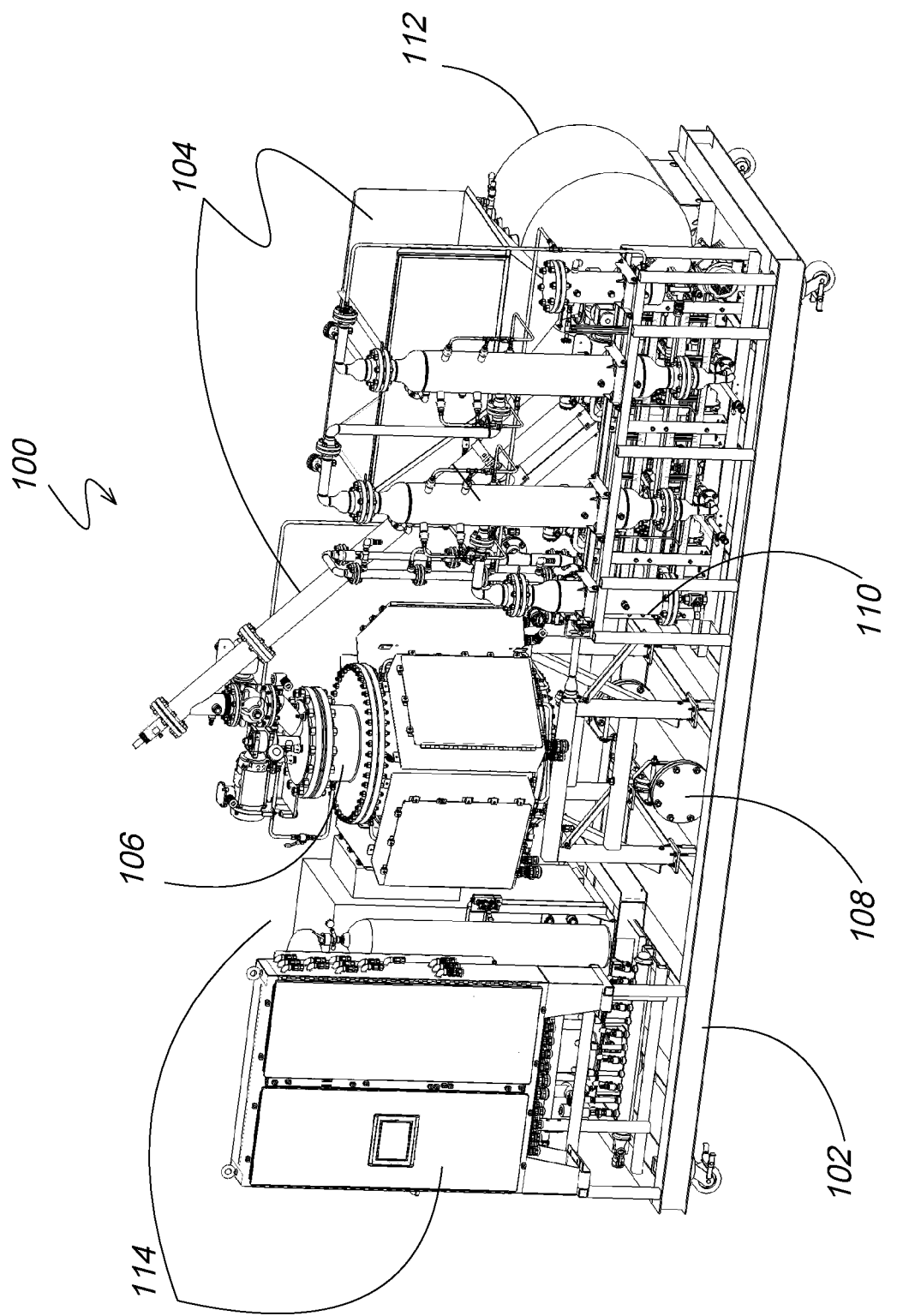
FIG. 1B is an upper front perspective view of the overall plastic pyrolysis system of the present invention, showing key subassemblies.

Referring first to FIG. 1B, the operational elements of the inventive system are shown in perspective view. The system is preferably sized and mounted on a metal base or frame 102 with locking casters to facilitate packing and transport in a standard ISO 6346 (20 ft.) shipping container. The system is configured to be shipped on an open "flat-bed" frame inside a 20 ft. footprint and shrink-wrapped for protection from the environment. The shrink-wrap can itself be treated and recycled.

Then, as seen in their most essential aspect, the component subsystems include a feedstock feed assembly 104, which includes a feedstock hopper 103 operatively coupled to an airlock conveyor or extruder purged with inert gas from an inert gas source (not shown in this view) and conveying a carbon-containing feedstock into a microwave heated highly insulated reactor 106. Proper temperature control is achieved using fast quenching spray condensers to facilitate effective product output. A catalyst may be introduced to promote pyrolysis in the reactor, and the light-gas flare or catalytic oxidizer output may be supplemented with and/or directed for use in cogeneration components. The diesel condenser may be provided with a level sensor.

Not shown but well-known in the art, a mechanical mill, grinder, shredder, or a combination thereof, comminutes the feedstock into small pieces suitable for introduction into the reactor chamber. The feedstock is stored and conditioned in an environment protected from contamination.

After the hydrocarbons have been cracked in the reactor, waste char is removed and collected in a waste char collector 108 and vaporized gases proceed through a cooling and condensation system 110, where the various lighter hydrocarbons are precipitated and collected in sequence as the cooling system increasingly removes heat from the flowing gas, eventually leading to storage in the fuel collection tanks 112, where diesel and gasoline are stored.

Feed Assembly: Referring next to FIGS. 2-2A, components comprising the feed assembly 104 include a material hopper 103 having one or more waste stream material level detectors 116, 118. A material type detector may also be included so as to prevent the introduction of materials that cannot be properly processed in the system and so as to provide data to tailor processing parameters to the specific feedstock. In embodiments waste detection/elimination as well as material overfeed detectors 120 are also included. Material stall detectors 122, 126 at the lower and upper ends of the auger conveyor prevent continued system operation when throughput of feedstock from the hopper to the reactor is obstructed for any reason.

The upwardly angled auger feed conveyor 119 includes an auger 121, preferably with continuous spiral flights having spiral edging 128 to promote material movement and prevent jamming. From the upper end of the conveyor, the feedstock is delivered to the reactor 106 through an extruder 105.

Reactor Assembly: Looking next at FIG. 3 through FIG. 4B, there is shown the thermal reactor assembly of the present invention (106 in FIG. 1B). Material infeed mixing is accomplished using one or more feed orifices (or dies) disposed in an orifice plate 130 through which feedstock from the conveyor system 104 is delivered to the thermal reactor 106 either driven under mechanically induced pressure (such as via pump or rotary vane valve) or through gravity feed. The orifices are configured to maximize surface area for a given material, and various orifice configurations 130a, 130b, 130c, can be seen in FIG. 3C. The system may be a "showerizer" using circular die with multiple holes 130a, or a "ribbon" strip 130c, or multiple strips 130b, so as to deliver and distribute a shower of feedstock input shaped for pyrolyzing at the temperatures and pressures optimal for the particular carbon-containing feedstock material.

A dry material cooling inlet 131 providing top plate water cooling may be employed to prevent plastic from sticking to the reactor top plate 141 and other reactor interior surfaces upon introduction to the reactor.

Referring next to FIG. 3D, there is shown a detailed side view illustrating one of various purge gas manifolds 133 used to create an inert gas atmosphere in accordance with the subject invention. The gas manifolds are configured and adapted to improve the safety of operations and the consistency of the pyrolysis process.

Looking now at FIG. 3E, disposed on the lower end of the reactor is an updraft exhaust 158 disposed in a funicular reactor outlet and cyclone separator 160, which includes a waste char port 162 and a gas outlet 164. The updraft exhaust includes a fine steel mesh filter to prevent contamination in downstream pipes. A cyclone plate is included in the reactor outlet and causes reactor output gas to swirl to assist in managing char and other solid wastes. Thus, the updraft exhaust subassembly connects what is in effect a cyclone separator to the bottom of the reactor to enhance solid waste removal. The updraft exhaust includes a flange 164 for coupling to a wax trap and reflux system (described more fully below), and the waste char outlet includes a flange 162 for coupling to a waste char collector. The cyclone separator further includes a temperature probe 166 which senses gas temperatures at the reactor outlet and generates signals forwarded to the control system used, among other system data captured and transmitted to the control system, to tailor microwave operation for optimum reactor temperatures.

As seen in FIG. 4 (a cross-sectional top plan view) and FIG. 4A (a cross-sectional side view in elevation), the reactor vessel outer shell 140 is cylindrical for structural integrity. The outer shell 140 encloses a polygonal (e.g., pentagonal) internal microwave cavity 138 shaped to optimize reflections. A centrally disposed microwave-transparent ceramic sleeve 142 defines an interior volume in which feedstock is pyrolyzed. In embodiments it may be segmented to reduce stress and to isolate cracks.

Heating in the reactor chamber is accomplished using a plurality of microwave generators 132 disposed around and affixed to the outer shell. The number of microwave generators corresponds to the number of sides of the polygonal internal microwave cavity. Waveguides 132a penetrate the outer shell to pass microwave radiation through waveguide windows 132b, preferably positioned at the outer shell, and through and into the internal microwave cavity. The waveguides and waveguide windows are cleaned using an inert purge gas introduced through a gas inlet 134 and through use of an "air knife" 136 at each of the waveguide windows.

Pulsed microwave heating is employed to improve efficiency, maximize heating, reduce arcing, and maximize mixing, in part due to microwave mixing through frequency mismatch. Optimal pulsing is driven, in part, by the feedstock chemical properties and optimal heating necessary for the pyrolysis process. The distance from the waveguide opening and the microwave load is calculated for microwave spread. And microwave leak detection (level and performance) is provided, as is well-known in the art.

Heat mixing: Prior to heat mixing, the reactor chamber 145 is purged of oxygen using an inert gas (e.g., nitrogen or argon), which reduces the risk of combustion and prevents oxidation and decay of components at high temperatures. Band heaters 144 are disposed around the polygonal cavity 138 between the cavity and the interior side of the outer shell. The band heaters are turned on and off selectively are used to pre-heat the chamber to reduce thermal stress and to complement microwave heating for maximum efficiency. The microwave energy is modulated both relative to power and time to achieve a consistent and efficient pyrolysis environment.

Disposed inside the ceramic sleeve are silicon carbide spheres 146 with a surface treatment selected according to feedstock chemistry. The spheres have a diameter between 0.375 inches to 1 inch in identical or mixed sizes. The spheres absorb conditioned microwave energy and conductive and radiant heat from band heaters. The sphere material, sphere diameter, surface features (e.g., roughness) and their dimensions are specified for optimal mixing and minimal internal ongoing arcing.

A selectively reversible axial spiral screw type mixer 148 moves and agitates the spheres and reacting feedstock for maximum and even heat distribution. The bearing system 150 for the mixer in this high heat environment includes graphite sleeve bearings 150*a* which may be coupled with a graphite thrust bearing, and a stainless secondary housing 150*c*, as seen in FIG. 3B.

A grate plate 139 disposed over the gas and char outlet is used to slow the flow of, and allow passage of, waste (char by-product). This enables optimization of both thermal insulation and residence time of material during pyrolysis and contributes to the breaking down and removal of waste from the main reactor.

Next, the mixing phase of process employs a cyclone separator 160, which can be an important step in the management of char and other solids waste. A cyclone separator 160 including a "swirler plate" 160*a* is operatively coupled to the bottom of the reactor to increase the effectiveness of solids removal in that section. The swirler plate begins spinning the syngas output into a vortex. In embodiments, non-condensable syngas may be fed into a cogenerator system to reduce load on shore power.

Waste management: Referring now to FIG. 5, there is shown the waste management portion of the pyrolysis system. Method steps including char mixing and removal using the spiral "screw" type mixer 148 to move and agitate char for maximum heat distribution and waste removal. As earlier noted, the screw type mixer has a selectively reversible screw direction for mixing and removal.

Figure 6:
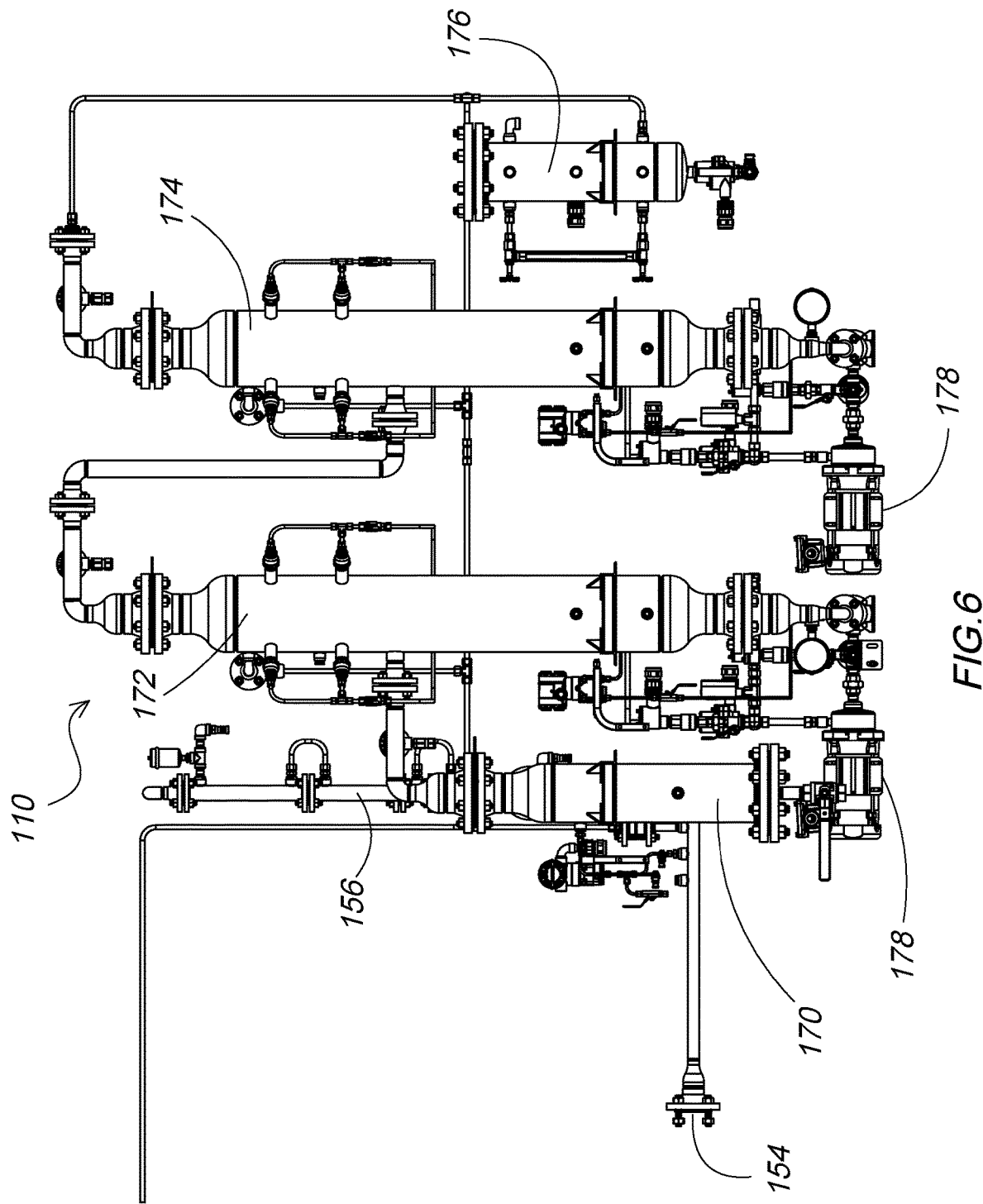
FIG. 6 is a front side view in elevation showing the gas condenser assembly in accordance with the subject invention.

Referring next to FIGS. 5-6A, disposed between the cyclone separator and the waste char collector is a knife gate 152, which acts as an "air-lock" and prevents any unwanted buildup of excess char. In embodiments, the waste char collector comprises a simple horizontally disposed cylindrical pipe capped with plates 153 at each end.

FIG. 5A shows the cracking chamber 156 of the present invention, which is in fluid communication and immediately succeeds the reactor gas processing, and preferably utilizes a catalyst 153 to further decompose the waste plastic through reverse-polymerization, thus breaking down the polymers into monomer chains that can be more efficiently recycled. The catalysts may include Lewis acids, super acids, metallized carbon, and zeolites. FIG. 5B shows a configuration 159, which, in an embodiment, provides dual cracking chamber units that may be installed in parallel for maintenance and repair and unit swap-outs that minimize disruptions to system operation.

Looking now at FIGS. 6-6A, coupled to the updraft exhaust 158 flange 164 is a feed line 154 with an in-line filter employed to trap and remove carbon debris for continuous and batch operations. After the catalytic cracking chamber 156 is a heavy oil/tar collector "wax trap" 170. In embodiments, the wax can be fed back into the reactor for further treatment.

Condenser Assembly: Referring still to FIGS. 6-6A, there is shown the condenser assembly 110. This incorporates the above-mentioned in-line filter 154 for wax and debris removal. Output gases escape the reactor chamber through an updraft tube 158 (see again FIGS. 3, 3E), which is angled downwardly to ensure a clean and uncontaminated extraction of gas, and to eliminate debris from the fluid stream prior to condensation. The gases then pass through a multi spray condenser and catalyst chamber 156 doped with an organometal material or zeolite 156*a* to ensure a consistent and efficient pyrolysis environment. Oil circulation is accomplished with a single pump that circulates and fills the oil tank.

Distillation of useable fuels is accomplished in the cooling/condensing system, which includes, in line and in series, a catalyst chamber 156, a reactor outlet/'wax trap' inlet cooler 157, a wax trap 170, a diesel condenser 172 in fluid communication with the reactor outlet cooler, a gasoline condenser 174 in fluid communication with the diesel condenser, and a terminal spraydown cooler 176 in fluid communication with the gasoline condenser. Pumps 178 drive the heat exchanger spraydown coolers respectively.

Fuel collection: The fuel collection portion 112 of the system is illustrated in FIG. 7. Here it is seen that collection involves the use of dual tanks 180, 182, each with capacity and flow rate measurement controls 184, 186.

Control Systems: System controls 114 are housed in a cabinet installed on and within the footprint of the mounting frame (FIG. 1B). Data acquisition involves a plurality of well-known sensors and monitors in electronic communication with the control system to send feedback signal loops to optimize material flow and fuel production. System controls include: Feedback logic, a Bluetooth interface, the above-mentioned data acquisition, and machine learning and IoT between customer and user-group machines. The machine learning uses temperature and yield results to optimize system parameters. Embodiments of the control system may employ a Bluetooth, WiFi, Ethernet, or cellular LTE interface for remote monitoring of operations, both for safety and convenience. Use of a Bluetooth communication system also enables remote warning systems.

From the foregoing, it will be appreciated that when considered as a method of converting a carbon-containing waste feedstock into useful materials, in its most essential aspect the invention includes the steps of: comminuting (grinding, shredding, pulverizing) the feedstock into particulate form; pelletizing the feedstock; melting the feedstock; providing a thermal reactor of the type described in the foregoing paragraphs and as illustrated in the accompanying drawings; transferring the feedstock to a thermal reactor using a mechanical transfer device; vaporizing the feedstock in the thermal reactor; and condensing, and separating fractions of the feedstock.

Additional method steps, carried out alone or in combinations, yet not necessarily carried out in any specific order, include: (1) treating and storing processed feedstock prior to delivering it to the thermal reactor to protect it from contamination; (2) feeding stored feedstock into the mechanical transfer device at ambient dry temperatures; (3) maintaining optimal material feeds and speeds as the feedstock enters into the thermal reactor, raising the temperature of stored feedstock to molten temperatures; feeding the molten feedstock into a material transfer device, and maintaining optimal material feeds and speeds as the molten feedstock enters into the reactor; (4) providing an extruder disposed between the mechanical transfer device and the extruder; (5) cooling the feedstock, prior to entry into the reactor, to approximately 30-50 degrees C.; (6) heating the feedstock in the vaporizing step to pyrolyzing temperatures of about 600-700 degrees C. at low pressures of 1-2 psig in an inert atmosphere; (7) using microwave absorbing spheres disposed in the thermal reactor to enhance the vaporizing of feedstock; (8) using a mixing auger in forward and reverse directions during the vaporizing step; (9) turning off the band heaters and modulating microwave power at various power levels and time intervals to achieve consistent and efficient pyrolysis; (10) mixing char byproduct at a variable rate to maintain a fill level at a lower portion of the reactor to insulate and dampen the microwave-absorbing spheres; (11) extracting char byproduct at a variable rate to provide batch or continuous process operation; (12) providing real-time process operations and override controls for local, onsite and remote applications through a connected wireless network; (13) passing pyrolyzed gas through a fine steel mesh to catch and block light char particles and debris; (14) passing pyrolyzed gas through a swirler plate at the outlet of the thermal reactor to start spinning the pyrolyzed gas into a vortex; (15) mounting the pyrolyzing system on a seagoing vessel and using fuels generated by the system to provide system operational power so as to ease load on shore power; (16) providing a catalyst tube with three vertical units that can be rotated into active position, wherein at least one vertical unit is always in process, at least a second vertical unit can be rotated out to be cleaned, and a third vertical unit can be positioned for heat pre-conditioning.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A system for converting a carbon-containing feedstock into one or more useful materials, comprising:
    a thermal reactor having a feedstock inlet and a gas and waste char output, said thermal reactor including,
    a polygonal internal microwave cavity having exterior sides;
    a cylindrical outer shell surrounding and encasing said polygonal internal microwave cavity on said exterior sides, said outer shell having a closed top with a feedstock inlet at the input end and a closed bottom with a gas and waste char outlet at the gas output end;
    a plurality of microwave generators disposed outside of, and coupled to, said outer shell, one each of said microwave generators for each side of said polygonal internal microwave cavity, said microwave generators including waveguides disposed through said outer shell and said internal microwave cavity to direct and deliver microwave energy to the interior of said internal microwave cavity;
    an inert gas source in fluid communication with said internal microwave cavity;
    a plurality of heating elements disposed around said internal microwave cavity;
    a vertically oriented microwave transparent ceramic sleeve generally centered in said internal microwave cavity and spanning between an inner side of said top and said bottom of said outer shell;
    a mixing auger rotatingly and axially disposed in said ceramic sleeve;
    a plurality of microwave-absorbing spheres contained within said ceramic sleeve and surrounding said mixing auger;
    an outlet grate through which vaporized gases and waste char pass after processing in said thermal reactor;
    a feedstock feed assembly in fluid communication with said feedstock inlet; and
    a cooling and condensation system in fluid communication with said gas and waste char outlet.

2. The system of claim 1, wherein said spheres are fabricated from a semiconductor material.

3. The system of claim 2, wherein said spheres are silicon carbide.

4. The system of claim 3, wherein the surfaces of said silicon carbide spheres have rough surfaces.

5. The system of claim 1, wherein said auger is reversibly operable.

6. The system of claim 1, wherein said auger is journaled in bearings at each end.

7. The system of claim 1, wherein said feed assembly includes a heater to render feedstock molten prior to delivery to said thermal reactor.

8. The system of claim 7, wherein said feed assembly includes an orifice plate disposed between said feed assembly and said thermal reactor and having orifices shaped to deliver feedstock with a surface area optimized for hydrocarbon cracking under microwave heating.

9. The system of claim 1, further including a cyclonic separator disposed on the bottom of said thermal reactor and between said cooling and condensation system.

10. A method of converting a carbon-containing feedstock material into one or more useful materials with a pyrolysis system, comprising:
    (a) comminuting the feedstock into particulate form;
    (b) pelletizing the feedstock;
    (c) melting the feedstock;
    (d) providing a thermal reactor including a polygonal internal microwave cavity having exterior sides, an outer shell surrounding and encasing the polygonal internal microwave cavity on the exterior sides, the outer shell having a closed top with a feedstock inlet at the gas output end at an inlet end and a closed bottom at an outlet end, wherein the feedstock inlet is disposed in the inlet end, and the gas and waste char outlet is disposed in the outlet end, a plurality of microwave generators disposed outside of, and coupled to, the outer shell, each of the microwave generators including waveguides disposed through the outer shell and the internal microwave cavity to direct and deliver microwave energy to the interior of the internal microwave cavity, a plurality of heating elements disposed around the internal microwave cavity, a vertically oriented microwave transparent ceramic sleeve generally centered in the internal microwave cavity and spanning between an inner side of the top and the bottom of the outer shell, a mixing auger rotatingly and axially disposed in the ceramic sleeve, a plurality of microwave-absorbing spheres contained within the ceramic sleeve and surrounding the mixing auger, a feedstock feed assembly in fluid communication with the feedstock inlet, and a cooling and condensation system in fluid communication with the gas and waste char outlet;

(d) transferring the feedstock to the thermal reactor using a mechanical transfer device;

(e) vaporizing the feedstock in the thermal reactor; and (f) condensing, and separating fractions of the feedstock.

11. The method of claim 10, further including treating and storing processed feedstock prior to delivering it to the thermal reactor to protect it from contamination.

12. The method of claim 11, further including:

feeding stored feedstock into the mechanical transfer device at ambient dry temperatures;

maintaining optimal material feeds and speeds as the feedstock enters into the thermal reactor.

13. The method of claim 11, further including:

raising the temperature of stored feedstock to molten temperatures;

feeding the molten feedstock into a material transfer device; and maintaining optimal material feeds and speeds as the molten feedstock enters into the reactor.

14. The process of claim 13, wherein the vaporizing step (e) involves heating the feedstock to pyrolyzing temperatures of about 600-700 degrees C. at low pressures of 1-2 psig in an inert atmosphere.

15. The process of claim 11, further including cooling the feedstock, prior to entry into the reactor, to approximately 30-50 degrees C.

16. The process of claim 15, further including mixing char byproduct at a variable rate to maintain a fill level at a lower portion of the reactor to insulate and dampen the microwave absorbing spheres.

17. The process of claim 16, further including extracting char byproduct at a variable rate to provide batch or continuous process operation.

18. The process of claim 10, further including mounting the pyrolyzing system on a seagoing vessel and using fuels generated by the system to provide system operational power so as to ease load on shore power.

* * * * *